United States Patent [19]

Entenman

[11] 4,162,483
[45] Jul. 24, 1979

[54] BILATERAL MASTER STATION-PLURAL SATELLITE STATION SIGNALLING APPARATUS

[75] Inventor: Alan W. Entenman, Hicksville, N.Y.

[73] Assignee: Intech Laboratories, Inc., Bohemia, N.Y.

[21] Appl. No.: 783,740

[22] Filed: Apr. 1, 1977

[51] Int. Cl.² .................. H04N 1/44; H04B 1/06; H04Q 9/00
[52] U.S. Cl. .................. 340/147 R; 178/66 R; 325/308
[58] Field of Search .................. 178/2 R, 4.1 R, 66, 178/68; 325/308, 492; 340/151, 147 R, 152 T; 179/15 AJ, 15 BD

[56] References Cited

U.S. PATENT DOCUMENTS

| | | | |
|---|---|---|---|
| 3,783,194 | 1/1974 | Vilips et al. | 178/66 R |
| 3,801,960 | 4/1974 | Edwards | 340/151 |
| 3,934,079 | 1/1976 | Barnhart | 325/308 |

Primary Examiner—Donald J. Yusko
Attorney, Agent, or Firm—Hopgood, Calimafde, Kalil, Blaustein & Lieberman

[57] ABSTRACT

A bilateral digital signalling network couples a master station and plural remote, or satellite stations via a common communications link—as by way of an MATV coaxial cable. Any data/control signals may be interchanged by the system stations—for example sensor station and closure latches in an apartment complex security system multiplexing security signals on the MATV video program disseminating cable.

The system employs sequential multi-mode remote stations. In accordance with varying aspects of the present invention, encryption verification is required and performed on transmission address and data fields; satellite stations revert to a predetermined secure state if not polled frequently enough by a master station; and structure is provided to prevent a station from failing in a "talking" condition which blocks (masks) all upstream transmission.

19 Claims, 3 Drawing Figures

STATE DIAGRAM

BILATERAL MASTER STATION-PLURAL SATELLITE STATION SIGNALLING APPARATUS

This invention relates to electronic monitoring and communication systems and, more specifically, to an improved bilateral digital signalling system operable via a common channel.

It is an object of the present invention to provide an improved bilateral digital signalling system.

More specifically, it is an object of the present invention to provide improved bilateral digital signalling between one or more master stations and typically plural slave stations via a common communications link, e.g., a video signal ensemble disseminating coaxial cable.

It is another object of the present invention to provide a bilateral signalling security system operable to monitor and control an environment.

It is a further object of the present invention to provide a terminal multiplexing system having plural satellite stations connected for communications at a like frequency on common equipment, where a failed satellite station is prevented from remaining in a "talking" mode masking and blocking all upstream transmission.

It is yet another object of the present invention to provide a bilateral signalling system employing a plurality of remote, polled satellite stations, wherein the remote stations revert to a preselected secure status it not polled within a maximum allotted period of time.

The above and other objects of the present invention are realized in a specific, illustrative bilateral signalling system operable to connect at least one head end and plural satellite stations via a common master antenna (MATV) which also conveys video programming. The satellite stations are randomly addressable by the head end (common) equipment and receive messages which cause upstream data reporting— as well as controlling varying apparatus associated with the particular satellite station addressed.

Each remote or satellite unit comprises a sequential circuit for effecting address, data and redundant address-data encoding message field recognition and verification; for transmitting a like formatted message upstream to the head end; and for escaping sequence to a waiting state responsive to a message discrepancy or a message destined for a different station. In accordance with another aspect of the present invention, should any remote station not be polled for a predetermined period of time, all station-controlled elements revert to a defined state (e.g., doors locked for a security application of the subject equipment). In accordance with a further aspect of the present invention, the remote, satellite stations are inhibited from failing in a "talking" mode such that no such failed station can mask upstream transmissions from other stations to the head end via the common MATV cable.

The above and other features and advantages of the present invention will become more clear from the following detailed description of a specific, illustrative embodiment thereof, presented hereinbelow in conjunction with the accompanying drawing, in which.

Figure 2:
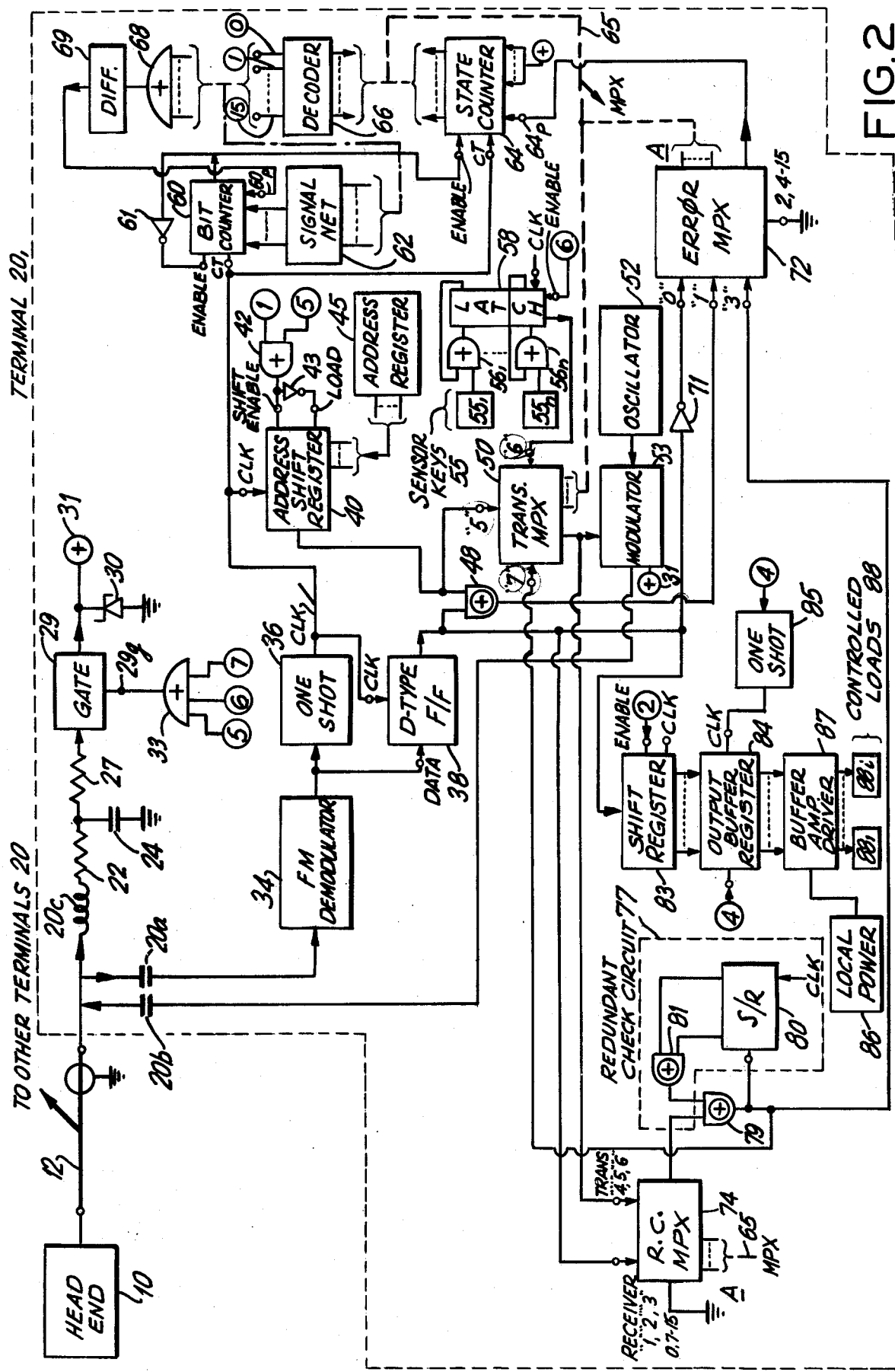
FIG. 2 is a block diagram schematically depicting the bilateral signalling arrangement in accordance with the principles of the present invention.

Referring first to FIG. 2, there is shown in block diagram form a bilateral signalling system wherein information is transmitted from a head end 10 to any intended one of plural satellite remote stations or terminals 20 each connected to a common communications link 12, e.g., a coaxial cable also used to disseminate head end - supplied video information; and to permit communications from each of the terminals 20 to the head end 10 via cable 12. In particular, for example for a security system which not only distributes video information but also secures an environment such as one or more apartment complexes, each terminal 20 may include a plurality of controlled loads $88_l, \ldots, 88_i$. Thus, for the assumed application, the controlled loads may comprise a combination of electrically controlled door locks, video cameras, recorded annoucements, power actuators, relay controlled appliances or contrivances, or the like.

Further at a station 20 there are a plurality of sensors-keys $55_l, \ldots, 55_n$ which may comprise contacts which report the open/close state of doors, condition overranges (e.g. an excessive temperature), operator-actuated keys to signal the head end 10 to issue a command to actuate any of the controlled loads 88 at that or another station, or the like. Moreover, subsets of the loads 88 and sensor/keys 55 may comprise associated digital bits to implement/report an analog level.

It its most fundamental aspects, the head end transmits serial messages for the terminals $20_j$, either addressing all of the terminals sequentially (cyclically) in turn, or issuing commands to any one or more of the terminals should that be appropriate. The messages transmitted by the head end to any station $20_i$ comprise an inert or leading continuous stream of binary digits of one state (e.g. "marks") followed by a start bit of the opposite ("space") binary value, address field, a data field, and an encryption field (e.g., an implementation of the well known Hamming code) which effects an encryption over both the address and data. The encryption field is then followed by a further continuous transmission of the passive signal state digits until the next station is addressed.

At the intended station, the address in the incoming address field is verified to assure that the message is intended for the receiving terminal 20. The data is ultimately stored in a buffer amplifier and driver 87 where the several received data field bits are stored and respectively used to control the loads $88_l, \ldots, 88_i$. The parity of the encryption bits is verified to assure proper message reception before the data is permitted to reach the output buffer 87 register. At all other, non-addressed stations 20, the address verification fails and the station is restored to a waiting condition. Even should a wrong address somehow be missed, the message will be rejected by the station by a failed encryption field verification.

Following message reception, the address station or terminal 20 transmits a message back to the head end 10 comprising a transmission of the address field, a data field reflecting the status of the sensor/keys 55 and encryption or parity digits run on the address and data fields.

The upstream and downstream transmissions occur at different frequencies and may or may not have the same modulation format, appropriate modems being employed in the head end 10, and stations 20 as per se well known to those skilled in the art. It will be assumed here that the same format is used, albeit at a different frequency for each direction of message propagation. Further, it will be appreciated that the carrier oscillators 52 in all of the terminals $20_j$ for downstream transmission operate at the same or substantially the same frequency.

Figure 1:
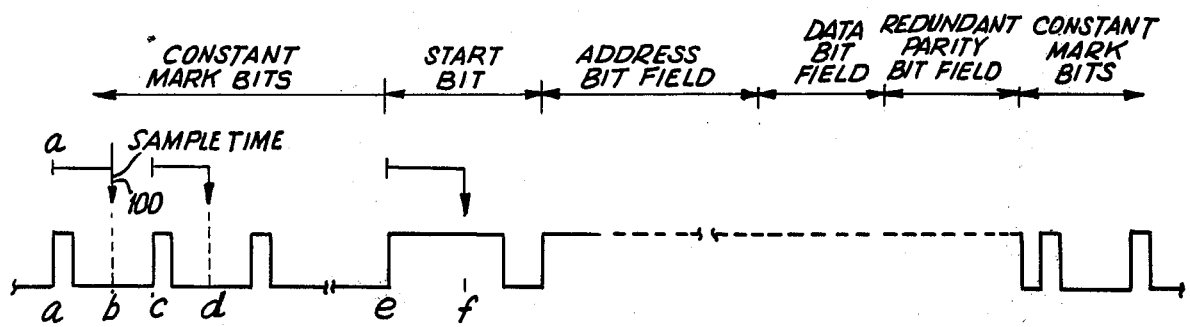
FIG. 1 is a timing diagram depicting a wave form characterizing binary signal transmission and detection.

The data transmission format is more particularly illustrated in FIG. 1 which shows carrier modulation (i.e., the signal which is modulated onto the upstream carrier at the head end 10). The head end 10 is not shown in detail, and may simply comprise a digital computer and data transmitting/receiving modem as well known and long employed per se by those skilled in the cable television art. Indeed, as will be more clear from the discussion below, the head end may comprise a CPU having its data has connected in place of loads 88 inputs 55 of the FIG. 2 illustration station 20 discussed below, with the appropriate transmit/receive timing interchange. For the assumed pulse width modulation (and any type modulation may in fact be employed) the binary "0" and "1" signals are represented by eight narrow or wide pulses, the narrow pulse being one Boolean binary character (e.g., a "mark") while the wide pulses are the other binary character, (e.g., a "space"). The advantage of a return-to-zero pulsed modulation system such as shown in FIG. 1 is that it has an internal, bult-in bit synchronizing clock. Thus, in accordance with the present invention as will be more fully discussed, the rising edge of a bit (as occurs, for example, at the times a, c and e in FIG. 1) triggers a delay (e.g., one shot circuit 36) which provides a sampling output pulse aproximately one-half a bit period later. The incoming wave is then examined at this delayed time (times b, d and f shown in FIG. 1) such that the final "0" and "1" binary states are respectively detected when a mark (narrow) or space (wide) bit pattern is encountered.

Figure 3:
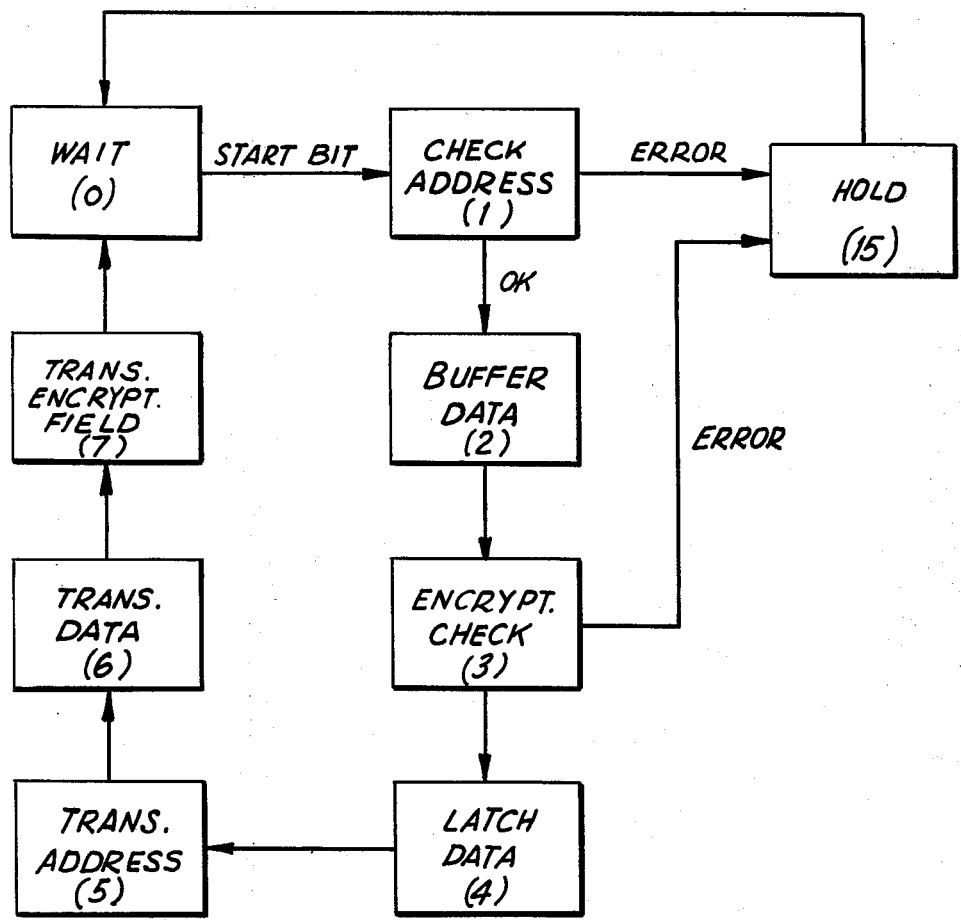
FIG. 3 is a state diagram illustrating operation of controlled stations $20_i$ in FIG. 2.

Before treating in detail the structure of the FIG. 2 system, attention will be briefly directed to the state diagram for each of the receiving stations 20 shown in FIG. 3. The station 20 is originally in a waiting state (state "0"). Upon receipt of the start (space) bit (FIG. 1 at time e) following a sequence of mark bits, the station 20 examines the next sequence of digits to determine whether or not the address field in the incoming, downstream head end 10 generated message is intended for it. If the address is intended for the subject station, the station switches to mode "2" where the next following data field is loaded into a temporary register. If verification for any address field bit fails, an error signal is generated and the system sequence flows to a hold mode "15" and thence to the initial wait mode "0".

Assuming the message was intended for the station 20 under consideration, after data is stored (state "2"), the next following transmitted encryption field is verified (state "3"). If a proper encryption field is confirmed signalling receipt of a good and proper message destined for the subject receiving station, the equipment transfers to a latch data mode "4" where the previously stored data (state "2") is loaded into an output register, buffer amplifier and driver 87. If the encryption check "3" fails signalling an error of some sort, control passes through hold mode "15" back to the wait mode "0" to await a possible further message.

Once mode "4" is entered incoming transmission is verified and, after data latching, system operation proceeds through modes "5", "6" and "7" to assemble and transmit an upstream message comprising transmission of a sending station's address (mode "5"), a data field transmission to report on the state of sensors/keys 55 (mode "6"), and transmission of station 20-generated encryption bits performing the same encryption as occured for upstream transmission (mode "7"). After transmission of such a completed composite message, control returns to the initial (wait "0") station to await further operation.

Referring now to FIG. 2, a downstream message impressed on the coaxial cable 12 by the head end 10 passes through a DC and low frequency blocking capacitor 20a in a station $20_j$ (the station $20_j$ shown in detail being typical), and is received by a demodulator 34 which is of a type to strip the modulation from the carrier, effecting the inverse of whatever modulation scheme is employed at the head end 10. It is assumed for purposes of concreteness that frequency modulation (or its equivalent, frequency shift keying, which is often employed in pay TV systems) is employed and thus the demodulator 34 is adapted to frequency demodulate the downstream message. The output of the frequency demodulator, effectively comprising the wave-form shown in FIG. 1, supplies its output to a one-shot delay circuit 36, and to an edge triggered, D-type flip-flop 38. The one-shot circuit 36 provides an output sampling pulse once each bit period which effects a delay from the beginning of each bit time to the approximate midpoint (e.g., delays a - b, c - d or e - f above considered). Thus, the clock (CLK) output of the one-shot circuit 36 comprises both the block CLK signal for the composite station 20, and also the input of the clock port of the D-type flip-flop 38. Thus, the output of the flip-flop 38 comprises a classic binary level sequence of high or low voltage states depending upon whether the downstream transmission was a narrow or a wide pulse.

The typical terminal $20_j$ includes a state counter 64 which resides in one of plural states corresponding to the ensemble of operational modes depicted in FIG. 3 and discussed above. The counter is initialized to a "0", wait state while waiting for message. The outputs of the counter stages 64 connected to a decoder 66 which has an energized "0" output during the wait "0" initial mode. A bit state counter 60 is included in each station terminal 20, and is effectively preset by a signal translation network 62 at preset data input ports to a value which characterizes the number of clock pulses required to fully perform any one of the functional modes shown in FIG. 3. Thus, for example, the counter 60 may comprise a four-stage ($2^4 = 16$ states) which is cleared to zero and thus has 16 states for mode "1" processing when an assumed 16 bit address is to be encountered, set to "12" where four states (16−12) are required to receive an assumed four data bits during data buffering mode "2" operation, and so forth. An OR gate 68 is connected to the outputs of the decoder 66 (or counter 64) and provides a changing output, converted into a pulse by a differentiator 69, which enables the counter 60 preset-port 60p each time the decoder 66 changes state to indicate the next mode. A particular presetting of the counter is then effected by the signal translation network 62 energized by a particular one of the decoder 66 output terminals. The signal translation 62 may be any well known Boolean combinatorial circuit for providing a defined output responsive to a particular excited one of its inputs. The translation network 62 may simply comprise a set of diodes connecting an input port to each output port to be energized when the corresponding input is activated.

The overflow or output of the counter 64 is connected as an enabling input to the state counter 64, and also coupled via an inverter 61 to an enable input of the counter 60. The inverter 61 thus disables the counter when the counter 60 resides in its final or output state which thus also enables the counter 64. For each mode, then, the counter 60 counts the appropriate number of clock CLK pulses to permit processing of the mode and then latches up, also enabling the counter 64 to respond to the next following clock pulse to advance to the next higher functional mode count.

During the waiting period when mark bits are being received (i.e., the period prior to the time e shown in FIG. 1) counter 64 alternately resides in its hold ("15") and wait (0) states.

Each time a new mark pulse comes in, the CLK output of one-shot circuit 36 provisionally toggles counter 64 from the "15" to the "0" mode, and the resulting binary "0" present at the output of the data reporting flip-flop 38 inverted at element 71 to supply a "1" binary value to the "0" input of an error multiplexer 72. At such time the addressing inputs A for multiplexer 72 are supplied with the state of the counter 64 ("0") such that the "1" value input at the "0" port of the multiplexer 72 is gated through to excite the preset port 64p of the counter 64. The presets the counter 64 to the "15" (hold) state shown in the FIG. 3 block diagram. Accordingly, at the beginning of the next clock period when the following mark digit is received, the enabled counter 64 recycles back to its cleared or zero state to again simply mark time during the interval preceding the time (e in FIG. 1) when the actual message begins responsive to a start bit.

When a start bit is received, the resulting clock pulse at the output of the one-short circuit 36 applied to the count (CT) input of the counter 64 clears the counter 64 to the "0" state. The "1" binary output of the flip-flop 38, inverted to "0" by inverter 71, applied to the preset port 64p of the counter 64 via multiplexer 72 is not effective to preset the counter 64. The counter 64 thus advances to the "1" address checking state shown in FIG. 3 responsive to the first address field digit to begin the next portion of a composite message receiving cycle of operation.

Attention will now be directed to operation in the "1" mode, i.e., where the station 20 is receiving an address message field. Prior to residing in the "1" mode, i.e., while the state counter 64 and the composite station 20 is in the "0" mode while waiting, neither input of an OR gate 42 is active, and thus the load port of an address shift register 40 is energized by an inverter 43. When this condition obtains, the address of the particular station $20_I$ illustrated is supplied from a fixed address register 45 to parallel load an address shift register 40. A shift-enable input of the register 40 is disabled at such time by the active output of OR gate 42. Thus, when mode "1" processing is encountered, the address shift register 40 contains the unique address of the terminal $20_I$.

Further by way of initialization for mode "1", the bit counter 60 is preset by network 62 to contain its final count less the number of bits required for the particular mode being processed. For the assumed situation of a 16-bit address, the counter 60 is cleared, i.e., preset to "0", when mode "1" is entered.

Accordingly, during mode "1" address recognition, the particular sixteen address digits appear at the output of the edge triggered flip-flop 38, while coincidently occurring clock pulses (CLK) appear at the output of the one shot circuit 36. The clock pulses are applied to the clock port of the address shift register 40, while the shift enable register 40 port is enabled and the load port disabled by the active "1" output of the decoder 66 which activates OR gate 42. Thus, the station 40 address is clocked out of address register 40 coincident with received address digits in the incoming message.

The received address bits and the stored unique station bits are coincidently applied to an exclusive OR gate 48 having its output connected to the "1" input of the error multiplexer 42.

Assuming the message was intended for the particular terminal $20_I$ shown, the like digits applied at the inputs of exclusive OR gate 48 cause its output to remain at zero. The error multiplexer 72, of course, selects the "1" input terminal thereof responsive to the "1" output of the state counter 64 applied to the multiplexer 72 address inputs A via the multiplexer address bus 65. Thus, assuming a message is addressed for the terminal $20_I$ the resulting zero output of multiplexer 72 does not energize the preset input of counter 64 which is thus not responsive to the "15"-indicating signals applied to its preset data ports. Conversely should any one of the message address bits received not correspond to the equivalent digit read out from address shift register 40, the exclusive OR gate 48 switches state which communicates an active signal to error multiplexer 72 which in fact causes the state counter 64 to become preset to its hold or "15" state, preparatory to returning to the "0" or wait mode responsive to the next clock pulse.

Assuming that the address field properly identifies the downstream message as intended for the illustrated terminal $20_I$, the first of the next following assumed four data digits which are next received are stored in a temporary holding shift register 83. To this end, the clock pulse associated with the first data bit advances state counter 64 to its "2" state which is so decoded by decoder 66. The energized "2" output of decoder 66 enables shift register 88 which then simply enters into its assumed four stages the four data bits as they sequentially arrive at the output of the data generating flip-flop 38.

After the fourth data bit is received, the bit counter 60 is latched up as above described, and the composite FIG. 1 arrangement awaits the beginning of the field of address-data encrypting digits, e.g., assumed to be four in number. Thus, when the first check bit is received, a corresponding clock signal generated at the output of the one shot circuit 36 advances counter 64 to its mode "3" (FIG. 3) state to process the encoding verification signal information.

As above described the redundant parity bit field forming a final part of a head end transmitted message performs an encoding on both the previously developed address and data bits in accordance with any defined code, and in any of the encryption equipment well known, per se, to those skilled in the art. Each station 20 includes a redundant check circuit 77 which includes structure for reproducing the encryption bit field generated at the head end (and which thus may duplicate encryption circuitry at the head end). Thus, for example, one well known encryption and encryption verification circuit comprises a shift register 80 having plural, spaced outputs connected by cascaded exclusive OR gates 81 and 79 back to the shift register input. The exclusive OR gate 79 performs the additional task of comparing incoming digits with locally (circuit 77)

generated bits and signaling at its output (corresponding to the input of shift register 80) when the locally generated encryption signals differ from those incorporated within the downstream message.

In overview, a redundancy check circuit multiplexer 74 couples received data (during station $20_1$ receiving modes) and data transmitted by the station emanating from a transmission multiplexer 50 during transmission modes, as inputs to the check circuit 77. Thus during signal reception during the mode "1" and "2" periods when the station $20_1$ is receiving information via the cable 12, the circuit 77 is in the process of generating parity or check bits in exactly the same manner as occurred (as by similar equipment) at the head end 10. During the parity check interval "3", the station $20_l$ generated parity bits in circuit 77 are compared in the exclusive OR gate 79 with those received from the cable. If all of the received bits correspond with those locally generated, meaning that the entire message is properly received, including the encryption field, there is no "error"-signaling output of exclusive OR gate 79. Accordingly, when bit counter 60 times out responsive to four clock pulses, operation proceeds to the latched data "4" and successor modes. However, should any one of the received redundancy check bits differ from that locally generated, the output of exclusive OR gate 79 switches state to energize the "3" input of multiplexer 72, thereby once again presetting state count 64 to the hold "15" mode thus rejecting the incoming data message which contain an error of some sort.

To effect the above mode of operation, the received data at the output of the D-type flip flop 38 is connected to the "1", "2", and "3" inputs of the redundancy check multiplexer 74 and thus communicated through to the output of multiplexer 74 during modes "1"–"3" under control of the multiplexer address A input furnished via bus 65 from the output of the station counter 64. Similarly, during the mode periods "5", "6" and "7" when the station $20_l$ respectively transmits its address, its data, and its encryption field (see FIG. 3), the output of the transmission multiplexer 50 is selected at commonly connected inputs "4", "5", and "6" of multiplexer 74, again under control of the signals on the bus 65. Accordingly, the redundancy check circuit 77 is operable during the encryption check interval "3" to compute and thereby verify parity for the received message; and operable during mode "7" to generate encryption data to form a signal output for the transmission modulation effected by multiplexer 50. During all other modes signaled by counter 64, the corresponding inputs to multiplexer 74 are inert (e.g. grounded) and have no effect.

Having thus considered the redundancy check circuit 77 and mode "3" processing, assume now that the redundancy check circuit 77 signals no error, and thus absolute verification is in hand that the incoming message is proper. At this point, the next following received bit (the first of the inter-message mark digits) generates a clock pulse at the output of one shot circuit 36 which advances state counter 64 to a four-count thereby energizing the "4" output of decoder 66. The energized "4" output of decoder 66 switches an output buffer register or latch 84 to a "load data mode", such that the previously held data in shaft register 83 flows into the register 84. The several output digits stored in register 84 are then further buffered and amplified as appropriate in amplifier and driver circuit 87 to provide driver control or to directly operate the several controlled loads $88_l, \ldots, 88_n$. In accordance with one aspect of the present invention, power for the buffer and driver 87 may come from a local power source 86 such that information is retained in system, and its basic operation proceeds, even if local power is interrupted.

After data loading (a signal count operation thus requiring a presetting of only one less than final state for bit counter 60), the next following clock pulse advances counter 64 to the transmit address mode "5" state. While this condition prevails, the address of the transmitting station $20_l$ is read out from address register 40, the shift-enable control signal passing to the shift-enable port of register 40 via the OR gate 42. The address of terminal 20 had previously been loaded into the shift register 40 from the fixed address register 45, as during mode "4" processing responsive to the unenergized OR gate 42 during mode "4" and the inverter 43 which activates the register 40 load control port. The next following series of clock pulses (16 for the assumed 16 bit station address) are then clocked out of shift register 40 into port "5" of the transmission multiplexer 50 which at this time receives the "5" selection address from state counter 64 via the bus 65. The output of multiplexer 50 (comprising address information during mode "5" processing) is supplied to a modulator 53, as is the output of a carrier oscillator 52. The output of modulator 53, thus comprising the carrier modulated with the desired intelligence, is then supplied to the cable 12 for upstream transmission to the head end 10 via high frequency coupling capacitor 20b. For purposes below discussed it is observed that the modulator 53 receives power from a voltage source mode 31.

During the next following mode "6" processing, the outputs of the sensor/keys 55 stored in the latch 58 are clocked out of the latch and flow through multiplexer 50 as the modulation input to modulator 53. The latch 58 is enabled for data shift register out flow by the enable terminal connected to the "6" output of decoder 66. Thus, at mode "6" time, the upstream message supplied to the cable 12 reports on the state of the sensor/keys 55.

In the environment control application postulated for the FIG. 2 system, it is typically desired to know whether or not a door has been opened or closed, rather than to simply report on the present state of a door or the like. Thus the sensors 55 (e.g., contacts opened/closed in response to a door opening/closure) are supplied by an associated OR gate 56 to a particular stage of the latch 58, the OR gate also receiving as a second input the output of the corresponding latch stage. Thus, if a sensor switches state to report a door opening (assumed to be a binary "1") during any time between polling cycles for the terminal $20_l$, the resulting "1" bit stored in the latch will remain stored therein by looping back on the latch input via the OR gate. The latch 58 is cleared during the clock out during mode "6" to start from a cleared state following each polling operation.

Finally for an upstream message operation, the encryption bits produced by the redundancy check circuit 77 during mode "7" time are supplied to the "7" input of transmission multiplexer 50, and comprise the operative modulator intelligence during such period.

Accordingly, following mode "7" the entire message required of the station $20_l$ has been transmitted. The next following clock signal will restore the state counter 64 to its initial state to again examine downstream data flow supplied by the head end 10 for possible address recognition for a message destined for that station.

Thus, the illustrative station 20, and thereby all such station have been shown by the above to effect bilateral communications with the head end 10 via the common cable 12.

Several observations are made at this point. First, a one shot circuit 85 is connected to a clear input of the output buffer register 84. The one shot circuit 85, in turn, is restored to a cleared, initial state during each mode "4" output from decoder 66 (the first mode signal developed after message reception is completely verified). Thus, assuming the station is polled frequently enough, the output of one short circuit 85 never rises to a level sufficient to clear the output buffer register 84 and thus data processing proceeds as above described. However, if more than a predetermined time elapses without consecutive verifying message received at a station 20$_i$, the one shot circuit 85 in fact clears the register 84, thus restoring all of the controlled loads 88 to a predetermined initialized state (which may be an all door locked condition where it is desired to secure a controlled environment).

Finally, it is observed that the modulator 53 requires voltage from a voltage port 31 to be operative. It will be assumed that DC potential is supplied by the head end over cable 12, although a local power source may be employed as well. For the cable supplied power case, a video and radio frequency voltage blocking coil 20c (which blocks video as well as the upstream and downstream message channels) passes DC potential to cascaded current limiting resistors 22 and 27 through a controlled gate switch 29 (e.g. a transistor switch) to a Zener diode 30. A charge storing capacitor 24 is employed intermediate resistors 22 and 27. The gate 29 is activated by an OR gate 30 each time power is required for the modulator 53, i.e., during the modes "5", "6" and "7". Thus, the inputs to the OR gate 33 are connected to the "5", "6" and "7" outputs of the decoder 66.

It will be appreciated that any one station 20$_j$ must transmit only a very small percentage of the time, an extremely low duty cycle. Thus a resistor 22 of large value is employed such that energy for the modulator 53 is supplied from the capacitor 24, rather than directly from the cable 12. That is, the capacitor 24 is trickle charged through a relatively large resistor 22 during the long periods between transmission cycles for the terminal 20$_i$ to its full energy state. Thereafter, during transmission, the modulator supplied potential comes from capacitor 24—not from the cable. Accordingly, should the terminal 20$_i$ somehow fail in a "talking" mode, i.e., where the modulator 53, multiplexer 50 and oscillator 52 are in a condition to continuously or intermittently transmit carrier, the capacitor 24 very quickly runs out of energy and such a failed terminal 20$_i$ effectively disconnects itself as an impediment to upstream transmission by other stations 20 since there is simply no supply potential to operate the modulator 53.

The above described arrangement is merely illustrative of the principles of the present invention. Numerous modifications and adaptions thereof will be readily apparent to those skilled in the art without departing from the spirit and scope of the present invention.

What is claimed is:

1. In combination, station means for transmitting and receiving plural bit messages comprising an address field, a data field and an encryption field; said station means including:
    a state counter;
    received message demodulating means;
    station address storing register means;
    error signal multiplexer means having plural data inputs, an output for selectively setting said state counter to a predetermined state, and addressing control means connected to the output of said state counter for interconnecting one of said multiplexer data inputs with said multiplexer output depending upon the content of said state counter;
    address error means having inputs connected to said station address storing register means and said demodulating means and an output connected to a first one of said plural error signal multiplexer inputs; and
    encryption field verifying means having an input connected to said demodulating means and an output connected to a second input of said error signal multiplexer means.

2. A combination as in claim 1, wherein said station means further includes state decoder means coupled to the output of said state counter.

3. A combination as in claim 1 further comprising a modulator, transmission multiplexing means having an output connected to said modulator and address control input ports connected to said state counter.

4. A combination as in claim 3 further comprising an oscillator connected to said modulator.

5. A combination as in claim 3 further comprising encryption multiplexing means having a first input connected to said demodulating means and a second input connected to said output of said transmission multiplexing means, and an output connected to said encryption field verifying means.

6. A combination as in claim 1 wherein said station means further comprises plural input source means, latch means having plural inputs connected to said plural input source means, said latch means having output connected to said transmission multiplexing means.

7. A combination as in claim 6 further comprising state decoder means coupled to the output of said state counter, means connecting a control port on said latch means with an output of said state decoder means.

8. A combination as in claim 1 wherein said station means further comprises received data output storing means for storing said data field of a received plural bit message.

9. A combination as in claim 8 wherein said station means further includes a state decoder coupled to the output of said state counter, provisional data latching means connected intermediate said demodulating means and said received data output storing means, and means selectively responsive to said state decoder for transferring data from said provisional data storing means to said received data output storing means.

10. A combination as in claim 1 wherein said station means further comprises received data output storing means connected to said demodulating means, delay means connected to said received data output storing means for clearing said output data storing means, and means connected to said state counter for initializing said delay means.

11. A combination as in claim 1 wherein said station means further comprises modulating means for generating said transmitted message, power supply means for said modulating means, said power supply means including a charge storage capacitor, means for slowly charging said capacitor, and means connecting said capacitor with said modulator means.

12. A combination as in claim 11 wherein said capacitor-modulator connecting means includes controlled gate means, and means connecting said state counter and the control port of said controlled gate means.

13. A combination as in claim 12 wherein said state counter-controlled gate connecting means comprises a decoder, and a disjunctive logic gate.

14. A combination as in claim 1 further comprising a common communications link, and plural additional station means like said station means connected to said common communications link.

15. A combination as in claim 1 further comprising additional counter means, and means responsive to the output of said state counter for presetting said additional counter.

16. A combination as in claim 15 further comprising means for latching up said additional counter response to said additional counter residing in a preselected terminal state.

17. A combination as in claim 16 further comprising means connected to said additional counter for selectively enabling said state counter.

18. In combination, common transmission means, plural transmitting and receiving stations connected to said common transmission means, each of said stations including transmitting means for supplying a modulated carrier wave to said common transmission means, the transmission carrier wave frequencies of said stations being substantially equal, receiving and data processing means for receiving and processing information transmitted to said station on said common transmission means, first energy source means for continuously energizing said receiving and data processing means, second, discretely operative energy source means for energizing said transmitting means in an interrupted manner, and supply means connecting said first and second energy source means for refreshing energy in said second energy source means, said supply means including coupling means for refreshing said second energy source means at a rate less than the rate at which said transmitting means draws energy from said second energy source means, whereby any one of said stations is thereby prevented from failing in a constantly transmitting mode to mask all transmissions on said common transmission means.

19. A combination as in claim 18 wherein said second energy source means including a capacitor, and wherein said coupling means comprises a resistance.

* * * * *